US010241929B2

(12) United States Patent
Vazhenin

(10) Patent No.: US 10,241,929 B2
(45) Date of Patent: Mar. 26, 2019

(54) DATA TRANSFER METHOD FOR PARALLEL TRANSFER OF DATA DIVIDED INTO A PLURALITY OF DATA GROUPS OVER MULTIPLE TCP CONNECTIONS SIMULTANEOUSLY

(71) Applicant: Simulatio Corporation, Yokohama-shi, Kanagawa (JP)

(72) Inventor: Dmitry Vazhenin, Yokohama (JP)

(73) Assignee: SIMULATIO CORPORATION, Yokohama-Shi, Kanagawa (JP)

(*) Notice: Subject to any disclaimer, the term of this patent is extended or adjusted under 35 U.S.C. 154(b) by 451 days.

(21) Appl. No.: 14/673,264

(22) Filed: Mar. 30, 2015

(65) Prior Publication Data

US 2016/0246538 A1    Aug. 25, 2016

(30) Foreign Application Priority Data

Feb. 19, 2015 (JP) .................................. 2015-030241

(51) Int. Cl.
*G06F 13/00* (2006.01)
*G06F 12/14* (2006.01)
(Continued)

(52) U.S. Cl.
CPC .......... *G06F 12/1408* (2013.01); *G06F 16/11* (2019.01); *H04L 12/00* (2013.01); *H04L 12/6418* (2013.01)

(58) Field of Classification Search
CPC ............ G06F 17/30902; G06F 9/3851; G06F 9/4887; G06F 9/4881; G06F 9/4843;
(Continued)

(56) References Cited

U.S. PATENT DOCUMENTS

2002/0078122 A1* 6/2002 Joy ....................... G06F 9/3842
718/102
2004/0255048 A1* 12/2004 Lev Ran ................ G06F 9/546
709/249
(Continued)

FOREIGN PATENT DOCUMENTS

JP    2006-050295 A    2/2006
JP    2013-012284 A    1/2013
(Continued)

OTHER PUBLICATIONS

Robert Kuschnig et al., "Improving Internet Video Streaming Performance by Parallel TCP-based Request-Response Streams", IEEE Communications Society subject matter experts for publication in the IEEE CCNC 2010 proceedings, Institute of Information Technology (ITEC), Klagenfurt University, Austria, pp. 1-5, Pubication Date: 2010.*
(Continued)

*Primary Examiner* — Robert B Harrell
(74) *Attorney, Agent, or Firm* — Rothwell, Figg, Ernst & Manbeck, P.C.

(57) ABSTRACT

A processor transfers a file in a memory by TCP (Transmission Control Protocol). The processor divides single file in the memory into the data group of the N unit (N is an integer more than 2), and creates the transfer jobs of N unit, each of the transfer jobs including data group of the N unit and offset position representing a position of the data group in the file. The processor assigns the transfer job to the transfer thread of the M unit which is the maximum number of simultaneous connection in the TCP and transfers the data group and the offset position appointed by the transfer job of the M unit among the data group and the offset positions of the N unit by the connection of the M unit in parallel.

14 Claims, 12 Drawing Sheets

(51) Int. Cl.
*H04L 12/00* (2006.01)
*H04L 12/64* (2006.01)
*G06F 16/11* (2019.01)

(58) Field of Classification Search
CPC ........ G06F 9/52; G06F 12/1408; G06F 16/11; H04L 12/66; H04L 29/06; H04L 29/0809; H04L 29/06068; H04L 29/08072; H04L 29/08135; H04L 29/08144; H04L 29/08549; H04L 49/351; H04L 12/00; H04L 12/6418
USPC .......................... 709/201, 213, 249; 718/102
See application file for complete search history.

(56) References Cited

U.S. PATENT DOCUMENTS

| 2012/0054362 A1* | 3/2012 | Tsao .................. H04L 12/66 709/232 |
| 2013/0004146 A1 | 1/2013 | Kaneko et al. |
| 2013/0138771 A1 | 5/2013 | Song et al. |
| 2014/0254365 A1 | 9/2014 | Yanagisawa |

FOREIGN PATENT DOCUMENTS

| JP | 2013-038664 A | 2/2013 |
| JP | 2013-097804 A | 5/2013 |
| JP | 2013-121028 A | 6/2013 |
| JP | 2014-225169 A | 12/2014 |
| WO | 2014185167 A1 | 11/2014 |

OTHER PUBLICATIONS

"Physical Cores V. Enhanced Threading Software: Performance Evaluation Whitepaper" pp. 1-11; Publication Date: 2003-2008.*

Office Action issued far Japanese Patent Application No. 2015-030241 dated May 17, 2016, with partial English translation (5 pages).

Office Action issued for Japanese Patent Application No. 2015-030241 dated Feb. 9, 2016, with partial English translation (4 pages).

* cited by examiner

DATA TRANSFER METHOD FOR PARALLEL TRANSFER OF DATA DIVIDED INTO A PLURALITY OF DATA GROUPS OVER MULTIPLE TCP CONNECTIONS SIMULTANEOUSLY

CROSS-REFERENCE TO RELATED APPLICATION

This application is based upon and claims the benefit of priority of the prior Japanese Patent Application No. 2015-030241, filed on Feb. 19, 2015, the entire contents of which are incorporated herein by reference.

FIELD

The invention relates to a data transfer method and a data transfer program.

BACKGROUND

Data of the quantity of relatively big data are transferred between different data communication equipments connected each other in a network. These data are called bulk data or file data. Data are usually processed to a file unit. Therefore, the file is transferred by a single file unit.

On the other hand, it is studied to use a given band effectively in order to raise transfer efficiency. There is packet division technology according to UDP (User Datagram Protocol) in this one (for example, referring to patent document 1). The UDP is connectionless and is the protocol of no procedure, and has less limitation than a protocol of TCP (Transmission Control Protocol). Therefore, in the UDP, it is possible to use a band effectively by detecting a data transfer rate in a transfer state and regulating a data transfer rate dynamically.

PATENT DOCUMENT

[patent document 1] a Japanese laid-open patent publication No. 2013-038664 (corresponding to Japanese patent publication 5152940).

On the other hand, above-mentioned TCP is a relatively complicated protocol. In other words, the TCP is a protocol to guarantee order characteristics, reliability, and the integrity of data by establishing a connection every transfer and carrying out the error detection of transfer data. It is difficult to apply a technique of patent document 1 to the protocol according to the TCP, because the technique of patent document 1 was a marginal utilization technology in the UDP that was a simple protocol.

SUMMARY

One aspect of the embodiment is a file transfer method includes dividing a single file in a memory into data group of the N unit (N is an integer and more than 2) and creating transfer jobs of the N unit including the data group of the N unit and an offset position by a processor, assigning the transfer jobs of N unit to transfer thread of M unit which is determined a maximum number of simultaneous connection in TCP (Transmission Control Protocol), and transferring the data group and the offset position of the transfer jobs of M unit which are assigned to the transfer thread of the M unit among the transfer jobs of N unit, in parallel, by the connections of the M unit of the TCP.

Because of dividing a single file into the data group of the N unit, creating the transfer job of the N unit, and multiplex transferring the transfer job of the N unit in the connection of the M unit using a connection of number of the simultaneous connection M of the TCP, it is possible to transfer the file by using a band of reliable TCP to the full. In other words, it is possible to shorten the transfer time for big file of the size. In addition, it is possible to restore the data group which are divided into an original file from an offset on the reception side, even if data group of the file which are divided are transferred in an independent connection (or a channel), because of transmitting the offset indicating the start position in the file of the data group with division data group.

DESCRIPTION OF EMBODIMENTS

Embodiments will be described in order of a first embodiment of the file transfer method, file transfer constitution, a second embodiment, a third embodiment, and other embodiments as follows. However, the transfer method and the system in the invention are not limited to these embodiments.

First Embodiment of the File Transfer Method

Figure 1:
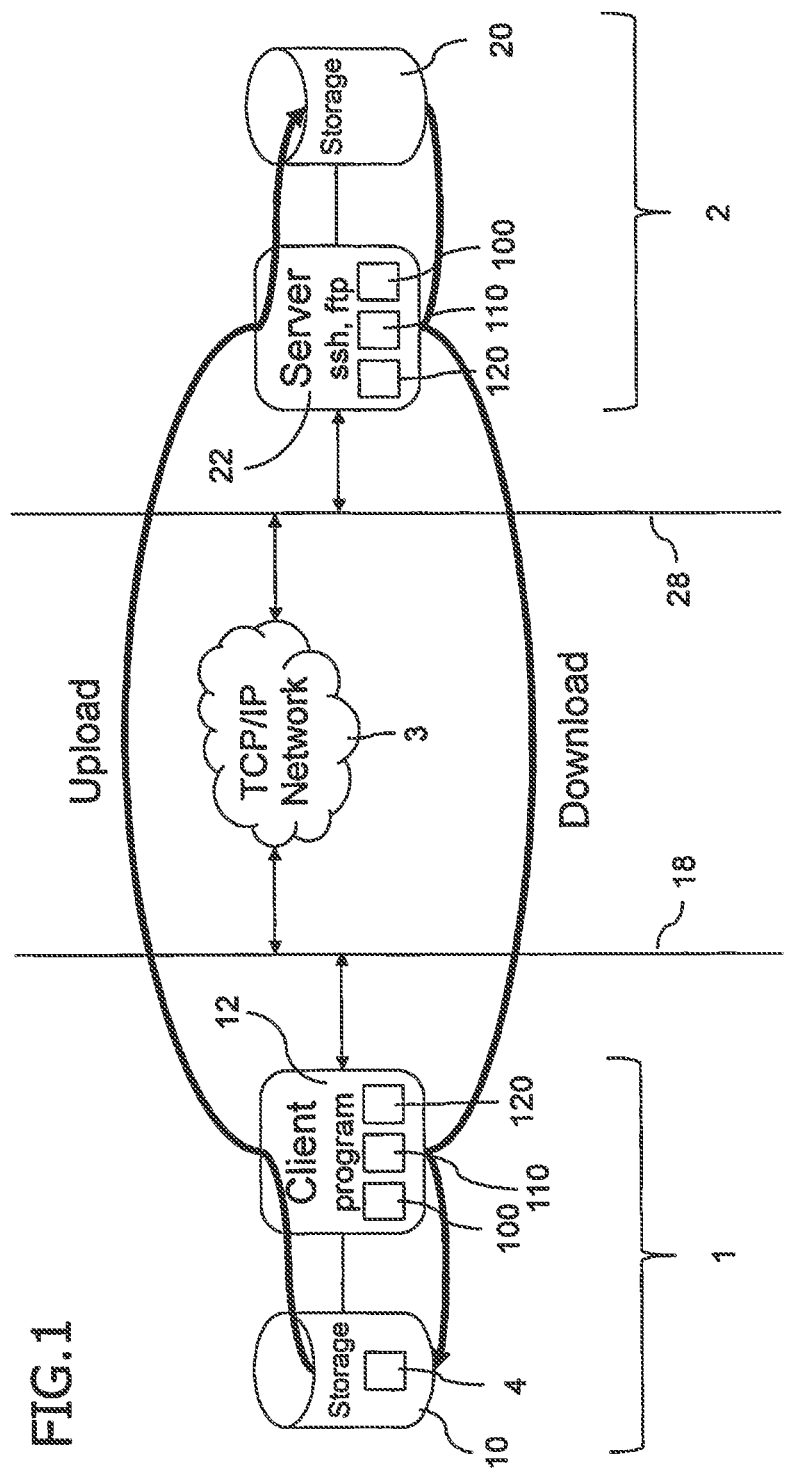
FIG. 1 is a block diagram of the file transfer system according to the embodiment.

FIG. 1 is a block diagram of the file transfer system according to the embodiment. As illustrated in FIG. 1, in the file transfer system, a first transmission and reception system 1 connects with a second transmission and reception system 2 through a TCP (Transmission Control Protocol) network 3.

In the embodiment, the first transmission and reception system 1 includes a first storage device 10 and a first terminal device (here a personal computer) 12. The first terminal device 12 executes reading and writing process of desired data using the first storage device 10. In addition, the first terminal device 12 is connected to the TCP network 3 through a LAN (Local Area Network) 18.

The second transmission and reception system 2 includes a second storage device 20 and a first server device 22. The first server device 22 executes reading and writing process of desired data using the second storage device 20. In addition, the first server device 22 is connected to the TCP network 3 through a LAN (Local Area Network) 28.

The first server device 22 has a ssh (Security Shell) server function (process) and an ftp (File Transfer Protocol) server function (process) of the transmission and reception system. In addition, the data transmission from the first terminal device 12 to the first server device 22 (to the second storage device 20) is called as an upload. Similarly, the data transmission from the first server device 22 (the second storage device 20) to the first terminal device 12 (the first storage device 10) is called as a download.

Each of the first terminal device 12 and the first server device 22 has a CPU (Central Processing Unit) 100, a memory 110 and a communication device 120. Below the embodiment will be described by an example in which the first terminal device 12 in the first transmission and reception system 1 file transmits (uploads) a file 4 stored in the first storage device 10 using the ssh protocol to the first server device 22 in the second transmission and reception system 2 through the TCP network 3.

Figure 2:
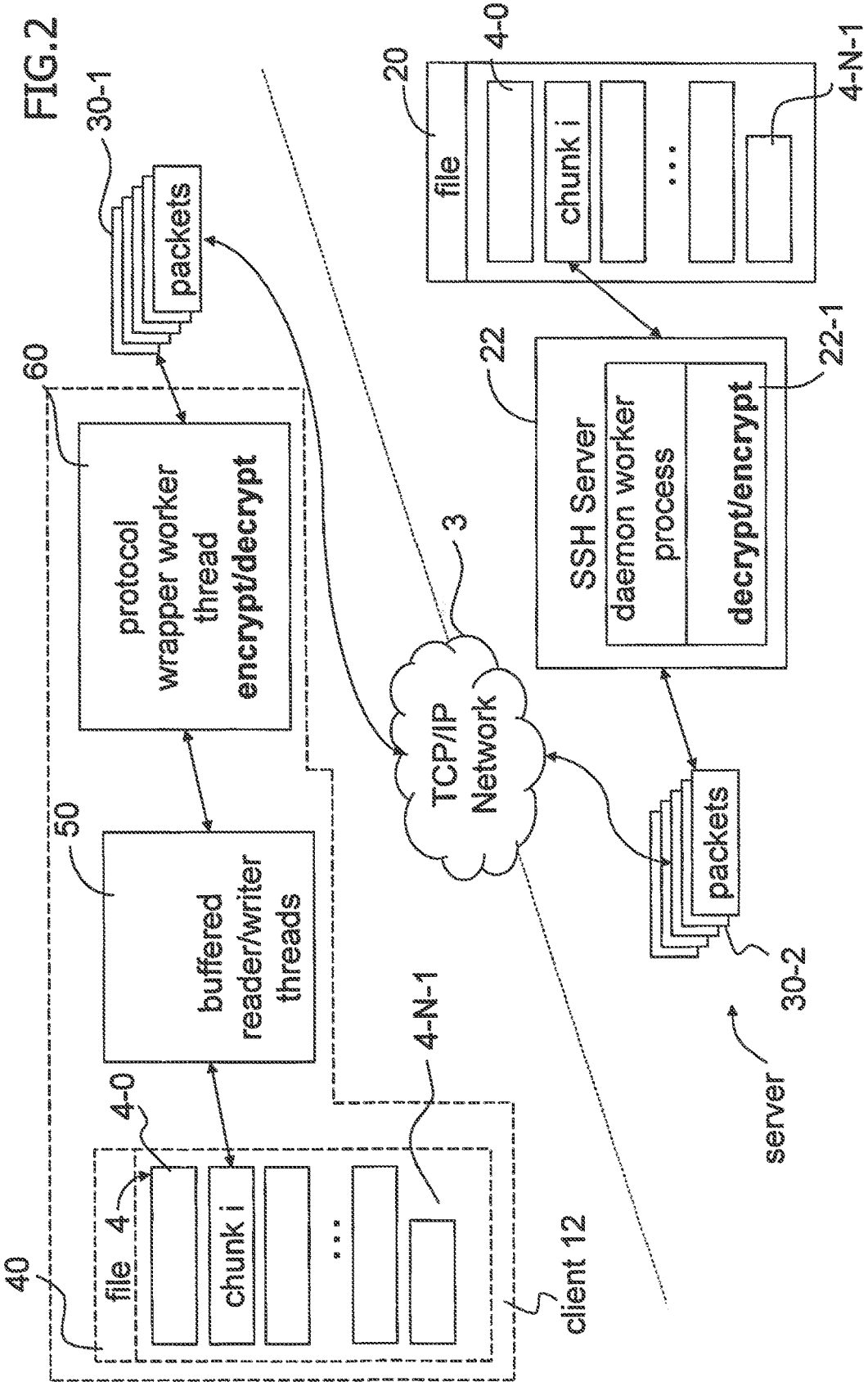
FIG. 2 is a diagram of whole constitution of the file transfer according to the embodiment.
Figure 3:
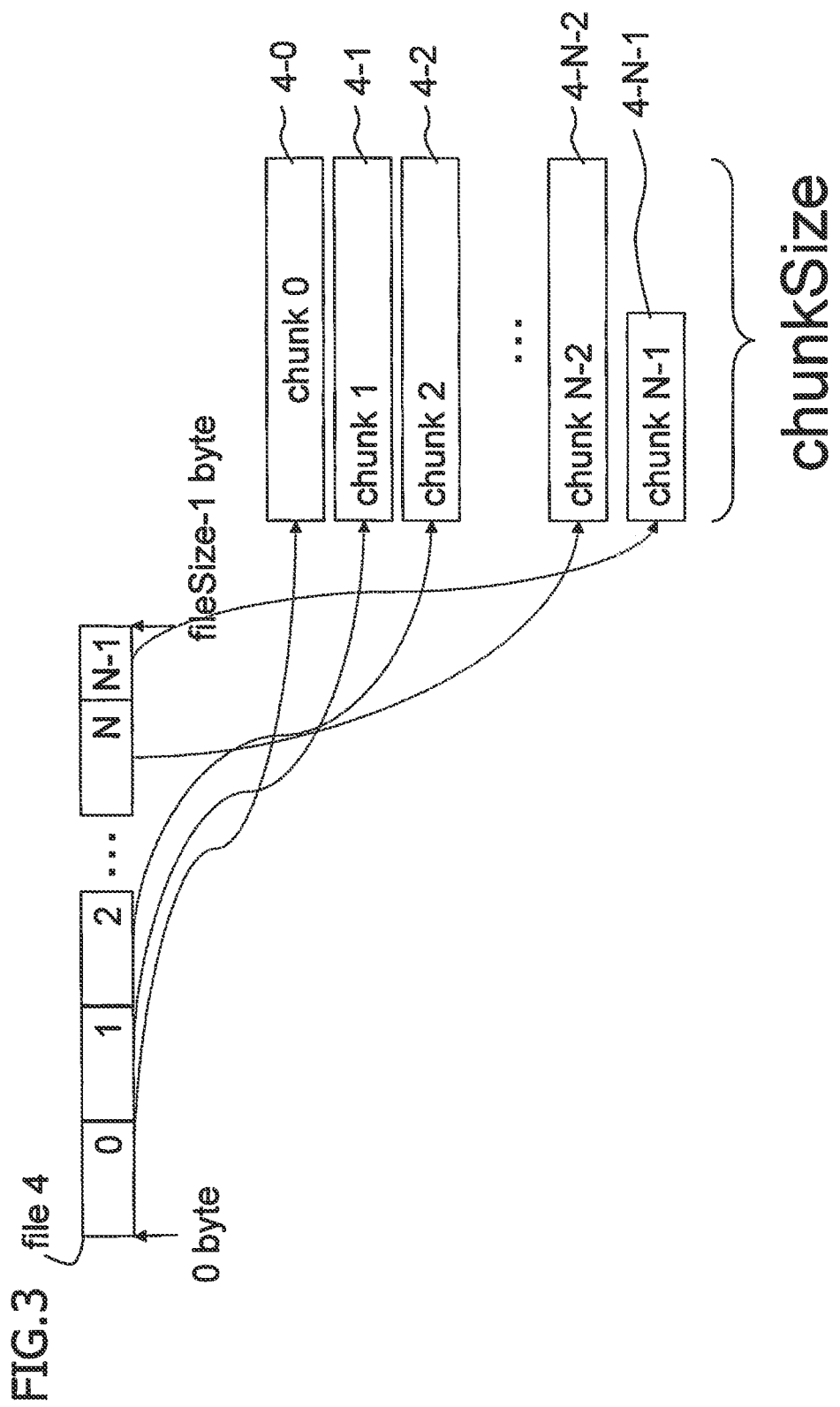
FIG. 3 is a diagram illustrating the file division process in FIG. 2.
Figure 4:
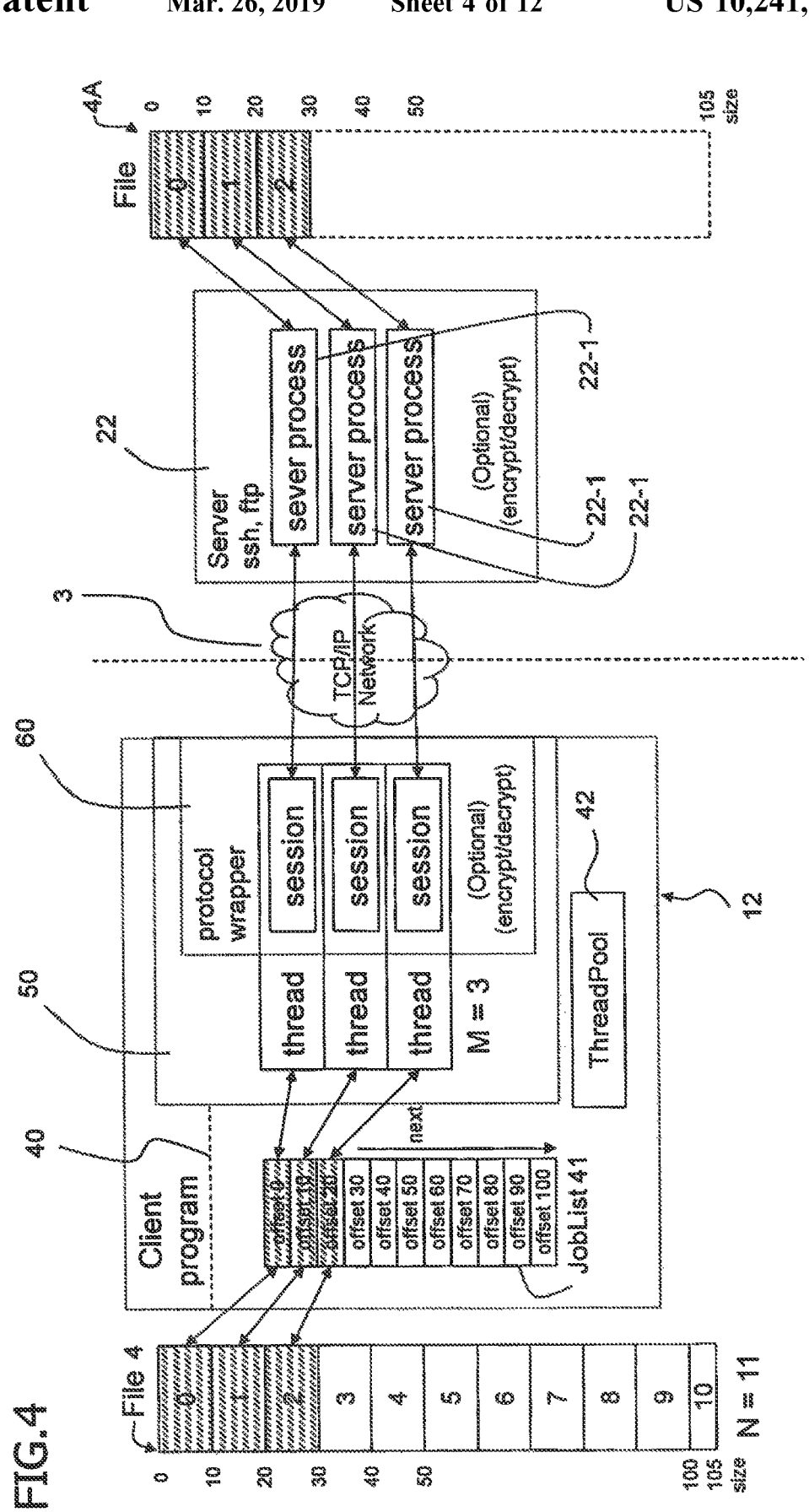
FIG. 4 is a diagram illustrating the multiplex thread streaming processing in FIG. 2.
Figure 5:
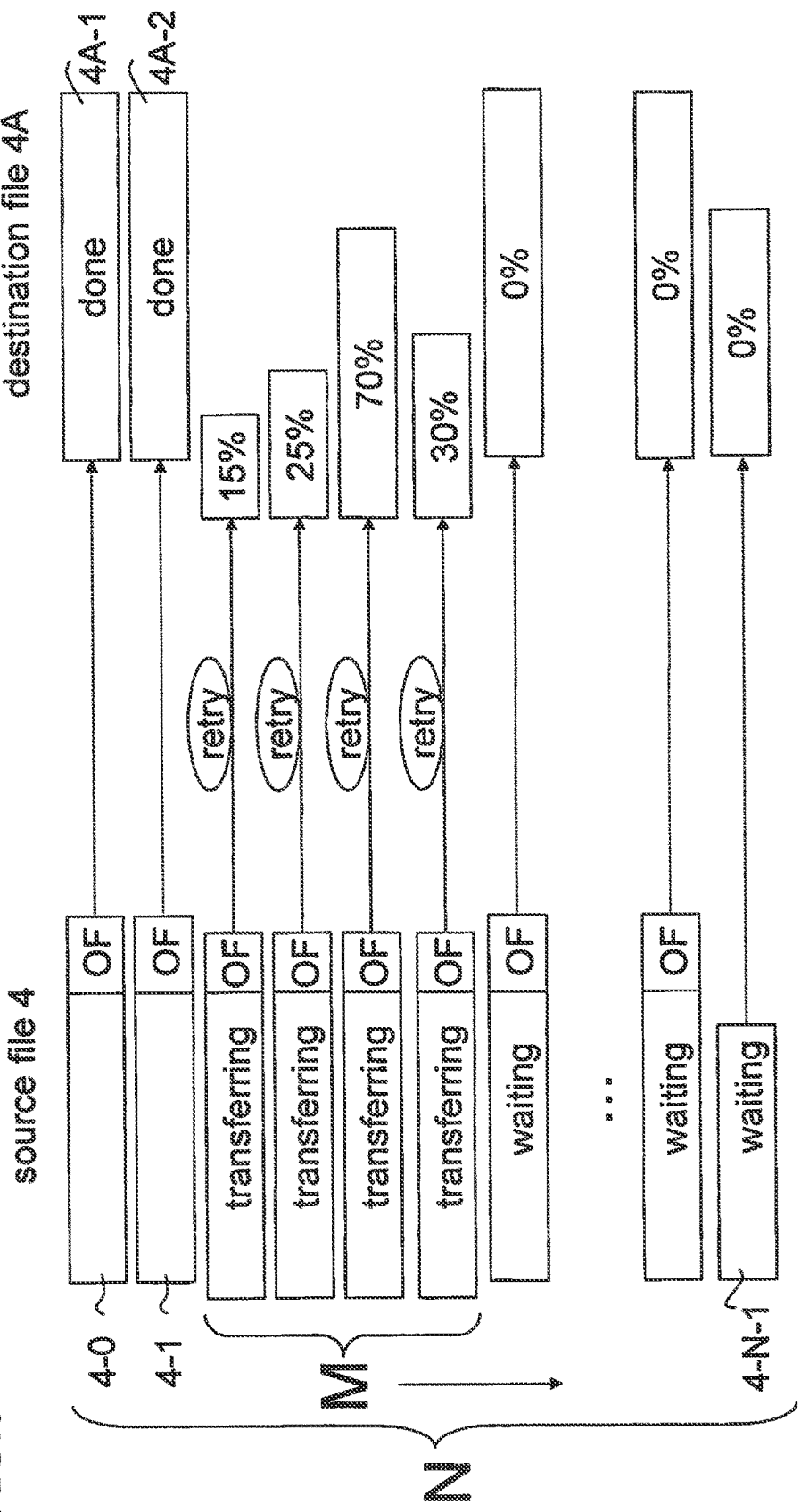
FIG. 5 is a diagram illustrating the multiplex thread transfer operation.

FIG. 2 is a diagram of whole constitution of the file transfer according to the embodiment. FIG. 3 is a diagram illustrating the file division process in FIG. 2. And FIG. 4 is a diagram illustrating the multiplex thread streaming processing in FIG. 2, FIG. 5 is a diagram illustrating the multiplex thread transfer operation, And FIG. 5 is a diagram illustrating the recycling processing of the multiplex thread in FIG. 2.

As illustrated in FIG. 2, the terminal device 12 is installed a multiplex transfer program which has file transfer modules 40, 50 of the application layer and a TCP processing module 60 of the transport layer. The file transfer modules 40, 50 have a transfer job creation module 40 and a transfer thread execution module 50.

The transfer job creation program 40 divide (split) a file size of an unitary file 4, which should transmit, into a unit to call chunk size, and creates the transfer job which has an offset indicating the start position in the file for every chunk which are divided. The transfer job that is created is administrated as job list 41 (referring to FIG. 4).

For example, as illustrated by FIG. 3, the file size of file 4 which should be transferred by set chunk size and virtually divided the file 4 into the chunks 4-0-4-N-1 of the N (N=file Size/chunk Size and is integer) unit from the top byte position of the file 4. The transfer job is created in response to each chunk divided virtually.

In FIG. 2 and FIG. 3, the file which are divided is represented by the chunk 0-N-1, And the transfer job creation module 40 creates the transfer thread of the number of maximum stream which are the number of the maximum which is able to connection at same time on the TCP protocol, and stores the transfer thread in a thread pool 42 (memory 110), in order to transfer each divided chunk 4-0-4-N-1 individually (referring to FIG. 4). However, when the number of the chunks N is smaller than the maximum stream number that is the number of the maximum connection at the same time of TCP, the thread of the N unit that is the number of the chunks are created and stored in the thread pool 42 (memory 110)

Then, as illustrated in FIG. 4, the transfer thread execution module 50 of FIG. 2 take a transfer job out of the top of transfer job list 41 for several minutes of the created transfer thread in the thread pool 42, and assigns one transfer job to one transfer thread and carries out a transfer job for every thread in parallel. One transfer thread makes one connection and requests protocol wrapper 60 of the TCP for the transfer of the chunk corresponding to the transfer job. In other words, the number of the connections to make is equal to the number of transfer threads.

The protocol wrapper 60 of the TCP transfers a divided chunk in a format of the TCP packet 30-1 using an individual connection at the same time in parallel. The protocol wrapper of the TCP 60 carries out the additional processing including the encrypting of packet, etc. . . . .

Referring back to FIG. 2, the TCP packet 304 is transferred to the first server device 22 via the TCP/IP network 3 that is the Internet. The first server device 22 carries out daemon processing (or SSH processing) 22-1, and decrypts the packet which is received. And the first server device 22 restores the packet 30-2 which is received into the file 4 consisting of a plurality of chunks 4-0-4-N-1.

In FIG. 4, the first server device 22 carries out data transmission processing 22-1 for each connection independently. This data processing 22-1 includes additional processing including the encrypting/decrypting and is carried out by the job scheduling of the OS. On this reception process, one CPU 100 is in charge of one process.

An example in FIG. 4 indicates that the file size of file 4 which should be transferred is "105", the chunk size is "10" and the number of the streams is "3". The transfer job creation module 40 divides the file 4 into eleven number of the chunks (=105/10=11) and creates the eleven number of the transfer jobs which is added an offset indicating the top position of individual chunks and the file name and stores it in the job list 41.

For example, the transfer job 0 (described as offset 0 in FIG. 4) in the job list 41 corresponds to the chunk 0. Similarly, each of transfer jobs 1-10 (described as offset 10-100) corresponds to the chunk 1-10.

The transfer job creation module 40 creates the transfer threads of the number of the maximum streams (here three) in the thread pool 42. The transfer thread execution program 50 assigns the transfer job to the individual of three transfer threads in the thread pool 42 (that is, assigns three transfer jobs to the connection of three streams) and requests the protocol wrapper 60 of the TCP 60 for transfer. And the protocol wrapper 60 of the TCP multiplexes and transfers three chunks in three streams in parallel, in FIG. 4.

FIG. 5 is a schematically diagram of this multiplex transfer operation. In FIG. 5, the number of the maximum streams (the number of the simultaneous connection) makes "M" (for example, M is four in FIG. 5 unlike FIG. 4). In addition, source file 4 should be divided into chunk 4-0-4-N-1 of the N unit. Furthermore, the chunk 4-0, 4-1 of the first and the second has been transferred. In that case, the chunks of the M unit (here four) after the third are assigned to the streams (connections) of the M unit (here four), and are transferred in parallel. In other words, the unitary file 4 is divided into a plurality of file units, and a divided file unit is transferred in independent TCP connection individually.

Because this individual TCP connection is independent, the transfer control which is the same as single TCP connection is carried out, for example, connect, an error detection, a re-try, an error correction, and a disconnect. In addition, in the individual TCP connection, the order of data characteristics is guaranteed. Therefore, as illustrated in FIG. 5, progress degrees of the transfer may be different for re-tries in four streams. In FIG. 5, a progress degree of the transfer is indicated by a percentage in a chunk in destination file 4A.

In addition, the number of these chunks N makes with a connection number at the same time, when the number of the chunks N is smaller than number of the maximum streams M. Furthermore, the connection of the stream which connected once is continued maintaining after transferring one chunk and is reused at the transfer of different non-transfer chunk when number of the chunks N is larger than number of the streams M. Therefore, it is possible to shorten a communication procedure about connection. When described using by FIG. 5, in the stream of the M unit, after transferring one chunk, the corresponding connection of the stream is continued maintaining as depicted by an arrow, and is reused when transferring different non-transfer chunk (described as waiting in FIG. 5).

Figure 6:
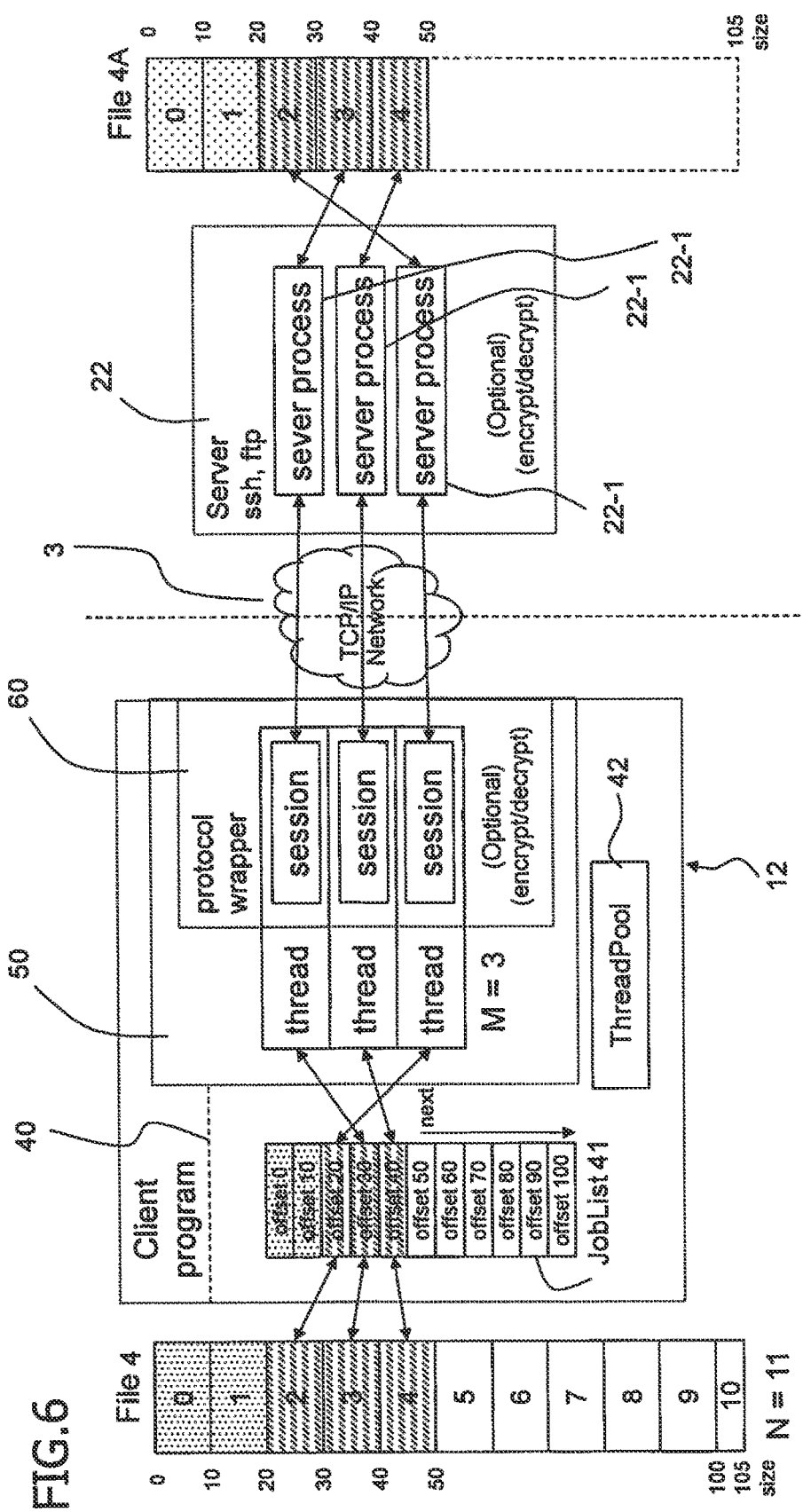
FIG. 6 is a diagram illustrating the recycling processing of the multiplex thread in FIG. 2.

The reuse of the connection in the transfer example of FIG. 4 is described by using FIG. 6. In FIG. 6, same elements depicted by FIG. 4 are same signs which are illustrated by FIG. 4. In FIG. 4, the transfer jobs of the first, the second, and the third chunks 0, 1, 2 are assigned to three transfer threads 0, 1, 2, and parallel transfer was carried out.

When the transfers of the first and second chunks 0,1 are completed here, connections of the transfer thread 0,1 are continued maintaining and the transfer jobs of the fourth and fifth chunks 4, 5 are assigned to the transfer thread 0, 1 which are empty (transfer was completed). Then, when a transfer thread completes the transfer of the chunk, the transfer thread which became empty is assigned, by round Robin method, to a transfer job of next non-processing in the job list 41.

Furthermore, as illustrated by FIG. 4, when the CPU 100 in the terminal device 12 constitutes multi-core (for example, more than 3 cores) and operates by JAVA (a registered trade mark), each transfer thread is assigned to each core, and is processed by a JVM (JAVA Virtual Machine). In other words, one JVM schedules each thread to the plurality of cores, thereby assigning processing and carrying out processing. In this embodiment, the process necessary for data transmission is carried out for every stream. For example, in the file transfer with the encrypting communication, after the data which read from a single file are coded, file transfer processing of the coded data is carried out. Therefore, the CPU used at the time of encrypting processing is limited to one, and the delay that is different from the data transmission operation occurs. Therefore, as a result, time required for transfer delays.

In contrast, in the present embodiment, at the time of file transfer with the encrypting processing, the data transmission is executed while the encrypting processing is carried out for every stream, Therefore, it is possible to use CPUs depending on the number of the streams in parallel, thereby can lower quantity of delay that is different from the data transmission operation.

In this way, a plurality of chunks are simultaneously transferred by using streams of the number of the maximum connection of TCP, by dividing a single file into a plurality of chunks, and creating individual transfer threads, Therefore, in limitation of the TCP, it is possible to use a band of the TCP to the maximum. In addition, reliability, order characteristics, data integrity by the TCP are just available.

On the other hand, the divided individual chunks are regarded as one file and transferred by the TCP. Therefore, distinction is difficult when a plurality of files is transferred on the reception side. In other words, the method for restoring original unitary source file 4 from the transferred individual chunks is preferable for the reception side.

In this embodiment, as illustrated in FIG. 5, the same file name and offset value are added to individual chunk data to transfer. The offset value indicates to a start position of the chunk data in the file 4, and is added to the top of the chunk data. In other words, as illustrated by FIG. 3, this offset value is a start address of the chunk when the file is divided into a chunk. On the receiving end, when the chunk data is received, the individual chunk data is started to write from the individual start offset position of the same file name. Therefore, it is possible that the destination file 4A is restored to the original state when all chunk data are completed to transfer.

(File Transfer Constitution)

Figure 7:
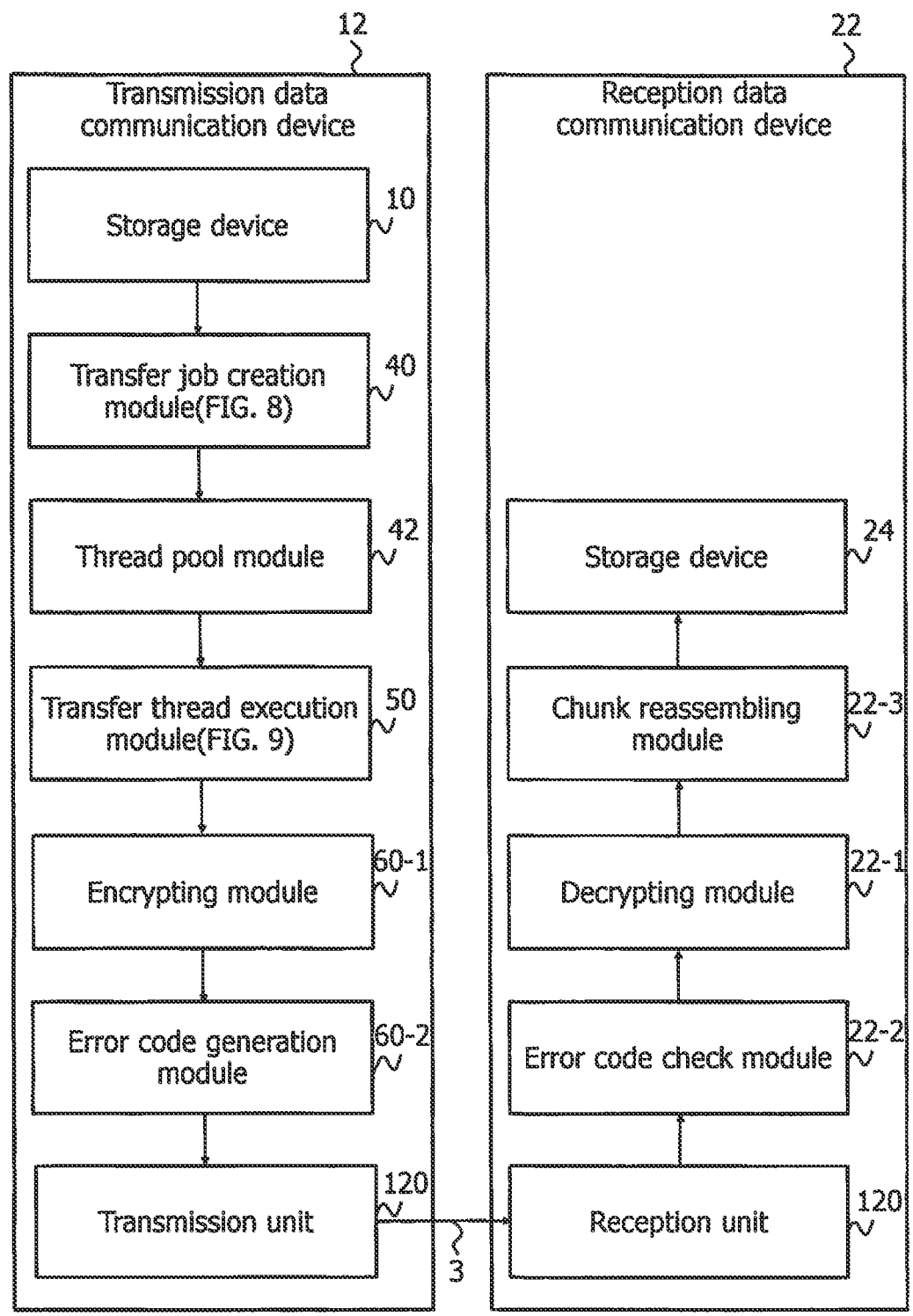
FIG. 7 is a block diagram of the file transfer constitution according to the embodiment.
Figure 8:
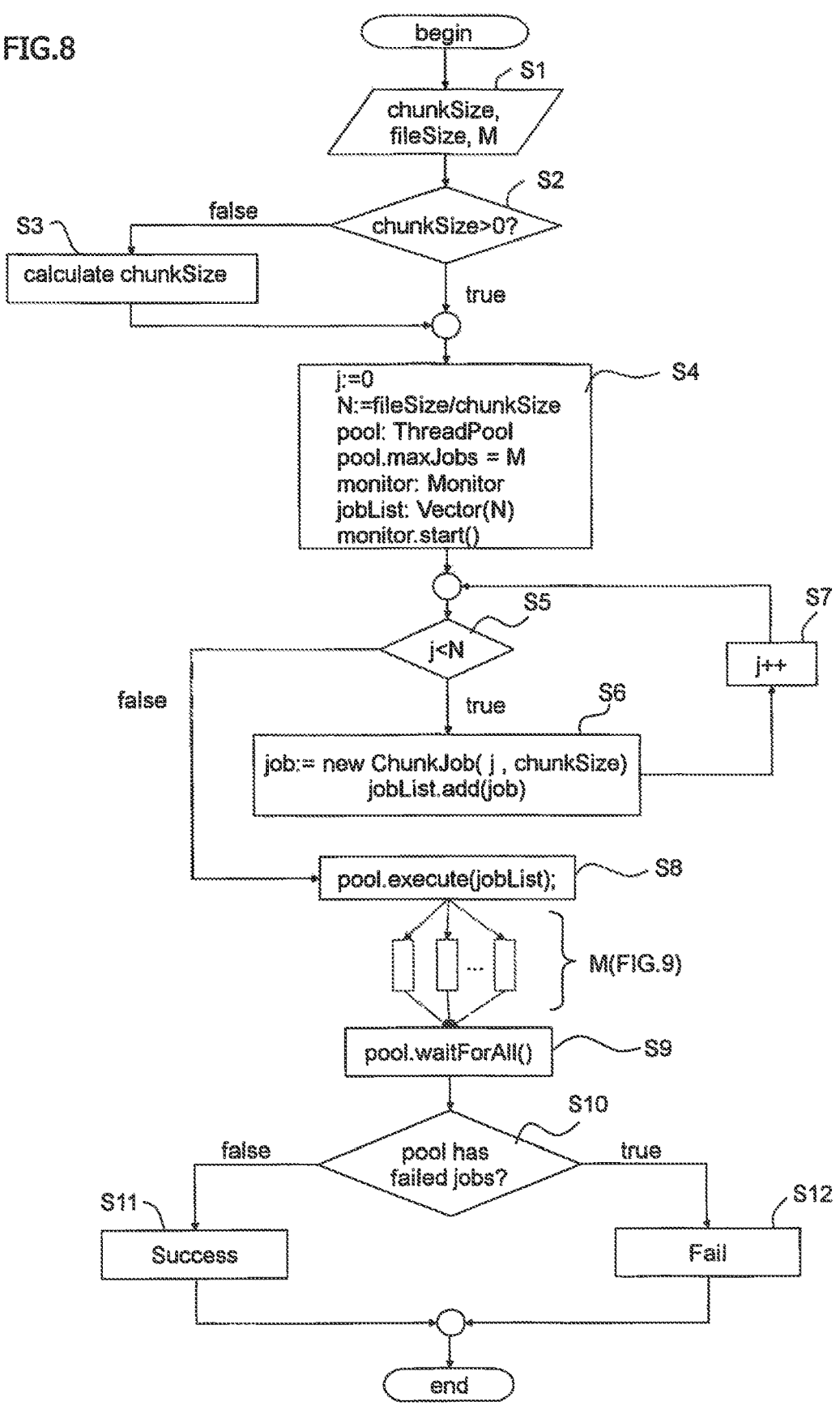
FIG. 8 is a flow diagram of the transfer job creation module in FIG. 7.
Figure 9:
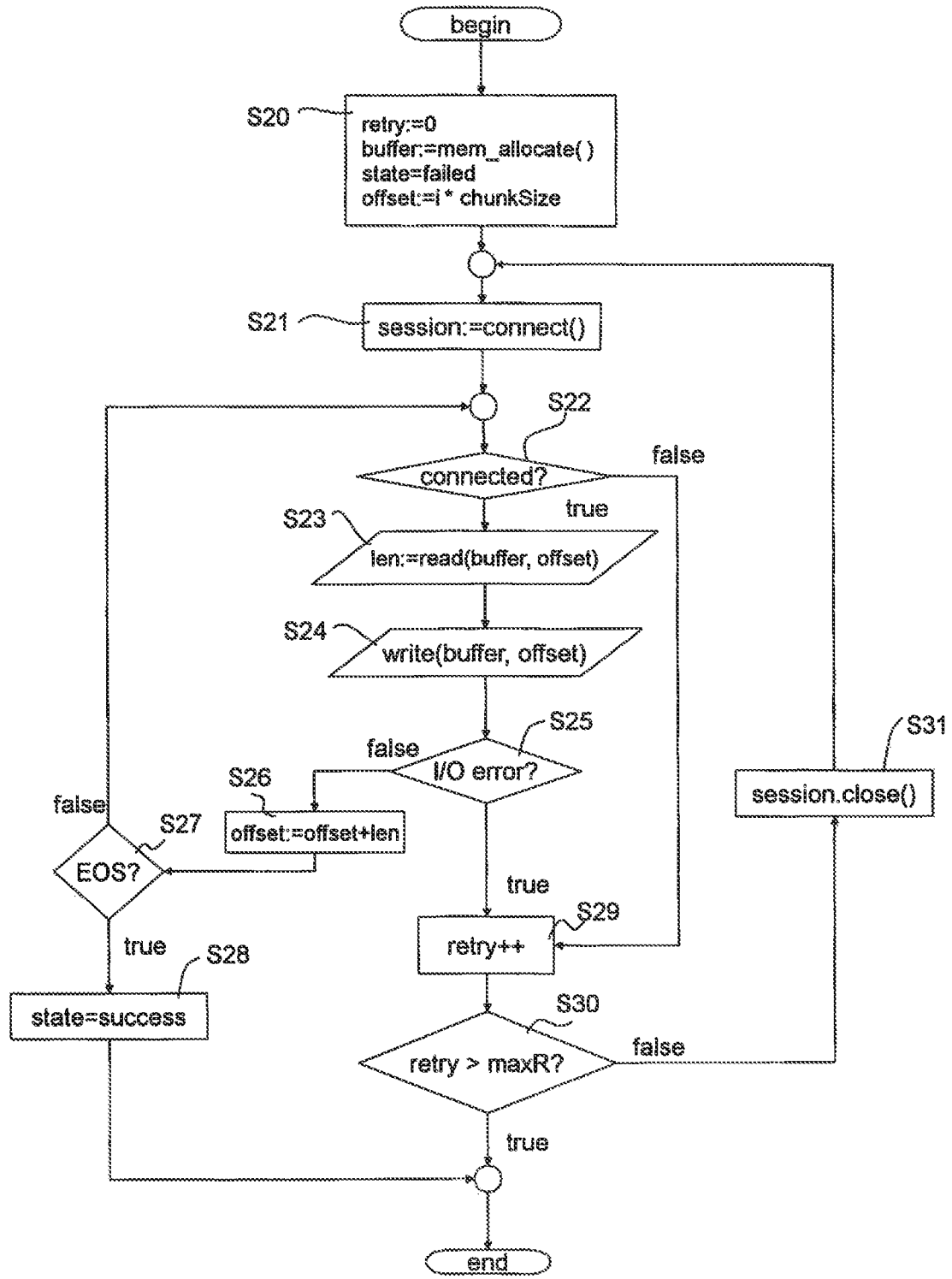
FIG. 9 is a processing flow diagram of the transfer thread execution module in FIG. 7.

FIG. 7 is a block diagram of the file transfer constitution according to the embodiment, FIG. 8 is a flow diagram of the transfer job creation module in FIG. 7. And FIG. 9 is a processing flow diagram of the transfer thread execution module in FIG. 7. In FIG. 7, same elements as that illustrated by FIG. 1 to FIG. 6 are indicated by the same sign. In addition, like a case of FIG. 1, the embodiment will be described in a case that the first terminal device 12 in the first transmission and reception system 1 the transfers (uploads) the file 4 stored in the first storage device 10 to the first server device 22 in the second transmission and reception system 2 through the TCP network 3.

As illustrated by FIG. 7, in the terminal device 12, the CPU 100 carries out the transfer job creation module 40, the thread pool 42, the transfer thread execution module 50, the encrypting module 60-1 and the error code generation module 60-2, The encrypting module 60-1 and the error code generation module 60-2 are parts of the TCP module 60.

The transfer job creation module 40 divides (splits) the source file 4 (referring to FIG. 1) in the storage device 10 into a chunk of a chunk size unit and creates a transfer job for every chunk which are divided, and stores it in the job list 41. In addition, the transfer job creation module 40 creates the transfer thread of the maximum number of streams which are the number of the maximum connection of the TCP, and stores it in the thread pool 42, The transfer thread execution module 50 assigns the transfer job to the created transfer thread in the thread pool 42 and assigns a connection to individual threads and requests the protocol wrapper of the TCP 60 for transfer.

The protocol wrapper 60 of the TCP creates connections (sessions) of the number of the maximum streams (the number of the maximum connection), and simultaneous transfers a divided chunk in a format of the TCP packet 30-1 using an individual connection parallel. In the protocol wrapper 60 of the TCP, the encrypting module 60-1 encrypts a packet and the error code generation module 60-2 generates an error code. The transmission unit (communication device) 120 establishes a connection of the maximum number of the streams with the transmission and reception data communication device 22 through the Internet 3 and transfers data according to the TCP.

In the transmission and reception data communication device 22, the CPU 100 carries out the error code check module 22-2 and decrypting module 22-1 and the chunk reassembling module 22-3. The reception unit (communication device) 120 receives the TCP packet through the Internet 3, and the error code check module 22-2 inspects the error of the TCP packet which is received. The decrypting module 22-1 decrypts the packet data after the checking of the error. The chunk reassembling module 22-3 restores the destination file 4A using the above-mentioned offset value from the chunk of a plurality of streams (referring to FIG. 5).

By using FIG. 8, the transfer job creation module 40 will be described. In this example, the chunk size and the number of simultaneous connection (the number of the connections) M are the fixed value that a user appoints. In addition, it is possible to assign the chunk size automatically by describing later by using FIG. 10. At first, control pointers are described. A pointer "j" indicates the number of the chunks, and its initial value is "0". A file size is total size of file 4. "N" is the number of the chunks, "M" is the maximum number of the simultaneous connection.

S1: The transfer job creation module 40 reads the chunk size, the file size and the number of the maximum connection "M" in response to a start of the transfer job creation module 40.

S2: The module 40 determines whether the chunk size exceeds "0". When the chunk size exceeds "0" (true), the chunk size is appointed.

S3: When the chunk size does not exceed "0" (false), the chunk size is not appointed. Therefore, the chunk size is calculated. Here, as described in the second embodiment of FIG. 10, the chunk size is calculated so that chunk size of the chunk which is divided equals in each chunk. For example, the chunk number of partitions "N" is a predetermined value. And the file size is divided by the chunk number of partitions "N", thereby calculating the chunk size.

S4: Then, the number of the chunk pointer j is initialized to "0" and the chunk number of partitions "N" is calculated. If the number of partitions N is the predetermined value in step S3, it does not need the calculation. When the chunk size is appointed, the chunk number of partitions N is calculated by (file size/chunk size) as described by FIG. 2 to FIG. 3. And a thread pool (domain) is secured as a pool (described as "pool: Thread pool") and the number of the maximum jobs in the pool is set to the maximum number of the simultaneous connection "M" (described as "pool. maxJob"). That is, the transfer threads of the M unit are created. And domain of the jobList is secured (described as Vector (N)). In addition, "monitor" in the block is used according to the third embodiment which is described by FIG. 11 and will be described in the third embodiment.

S5: The module determines whether the chunk pointer "j" is smaller than the number of partitions N of the chunk (j<N).

S6: When the chunk pointer "j" is smaller than the number of partitions N of the chunk (true in Step S5), the state is that the file 4 has not yet divided into "N". Therefore, a new chunk (transfer) job is created and added to the job list 41.

S7: Then, the chunk pointer j is incremented (j++), And the process returns to the step S5.

S8: When the chunk pointer "j" is not smaller (larger) than the number of partitions N of the chunk (false in step S5), the state is that it completes that the transfer job of the chunk of the N unit are created for one file 4. Therefore, it is carried out to assign a transfer job to a transfer thread in the thread pool 42 and to start the thread. By this operation, the transfer thread start module 50 in FIG. 9 starts for each transfer thread of maximum number of the connection "M". The processing of this transfer thread execution module is described later in FIG. 9.

S9: The module 40 determines whether each transfer thread in the thread pool 42 became the wait state (there is not a transfer job to assign).

S10: When determined that each transfer thread in the thread pool 42 became the wait state, the module 40 determines whether there is failure (failed) job of the transfer in the thread pool 42.

S11: When determined that there is not a failure job in the thread pool 42 in step S10 (false), it is determined that the transfer is success and the process is finished.

S12: When determined that there is a failure job in the thread pool 42 in step S10 (true), it is determined that the transfer is a failure and the process is finished. In this case, it is determined that transfer of the whole file is a failure.

In this way, when starting the file transfer, a file is divided into the chunk of the N unit and each transfer job is created. In addition, the thread pool is provided for storing threads of number of the simultaneous connection M and created transfer job is assigned to the transfer thread, thereby controlling the execution of the transfer thread (multiplex transfer by the maximum number of the connection). When the execution of one transfer thread in the thread pool is completed, the next transfer job is assigned to the transfer thread, and the execution of the transfer thread is started (that is, start chunk transfer). When there is no transfer job to assign to the transfer thread in the thread pool, it is determined that one file transfer completed.

Then, by using FIG. 9, the transfer thread execution module 50 will be described. At first control pointers are described. A "retry" indicates the transfer re-try number of times in the TCP. A transfer state (state) indicates whether the transfer is success or failure (failed). A "buffer" indicates to a top address (allocate ( )) of the file which should be transferred in the memory 110. An "offset" indicates the top position of each chunk in the file 4. For example, a chunk of No. i is offset=i*chunk size (the chunk size which is explained in FIG. 3).

S20: The re-try pointer "retry" is initialized to "0" when starting the transfer thread execution module 50. And the transfer state "state" is set to a failure (failed) and the buffer is set a top address of file 4 which should be transferred. In addition, the offset (Offset) is calculated by "i*chunk size".

S21: The session is set to the connection (connect). Thereby, the TCP wrapper 60 (referring to FIG. 4) establishes the TCP connection.

S22: The module determines whether or not received the notice of success in connection from the TCP wrapper 60. When the module has not received the notice of the success in connection (false in step S22), the process advances to step S29.

S23: When the module receives notice of success in connection from the TCP trumpet 60 (true), the module sets a transfer length "len". In other words, one chunk data is divided into a plurality of TCP packets and is TCP transferred. Therefore, data for reading size "buffer" of the TCP packet from the offset position of the chunk is read and the reading size is set in the transfer length "len".

S24: The data which is read is written in a transfer buffer of the TCP wrapper 60. In this way, the data transmission of the chunk is started in the connection concerned.

S25: It is determined whether there is the notice of the I/O error from the TCP wrapper 60.

S26: When there is not the notice of the I/O error (false), it is determined that the transfer of the chunk were completed and the offset is updated. In other words, "offset"="offset+len" is calculated.

S27: Then, it is determined whether it is end of the stream, namely EOS (end of stream condition). For example, the EOS means when it becomes offset>=(i+1)*chunk size (that is, in the step S26, a case beyond the file size) and when arrives at the end of the file. When it is not the EOS (false), the process returns to the step S22.

S28: When it is determined to be the EOS in step S27 (true), the transfer state is set the success and the process is finished.

S29: When there is the notice of the I/O error in the step S25 (true), the re-try number of times "retry" is incremented by "1".

S30: It is determined whether the re-try number of times "retry" becomes over maximum (max R) of the re-try number of times. When the re-try number of times "retry" is over the maximum (max R) of the re-try number of times (true), the transfer movement is finished. In this case, the transfer state (stat) comes to remain the failure initialized in the step S20.

S31: When the re-try number of times "retry" does not go over the maximum (max R) of the re-try number of times (false), the session is closed and the process returns to the step S21.

In this way, when carrying out the transfer thread, a session is set in the connection and the transfer connection of the chunk concerned is secured. When securing the transfer connection of the chunk concerned, the data and the offset of the chunk concerned are output to the TCP wrapper 60. The TCP wrapper 60 transfers the chunk data concerned and the offset in the connection concerned in the TCP. In addition, the process depicted by FIG. 9 is represented one transfer thread. However, the processing of the maximum number of the connection M unit really runs as explained in FIG. 8.

Second Embodiment

Figure 10:
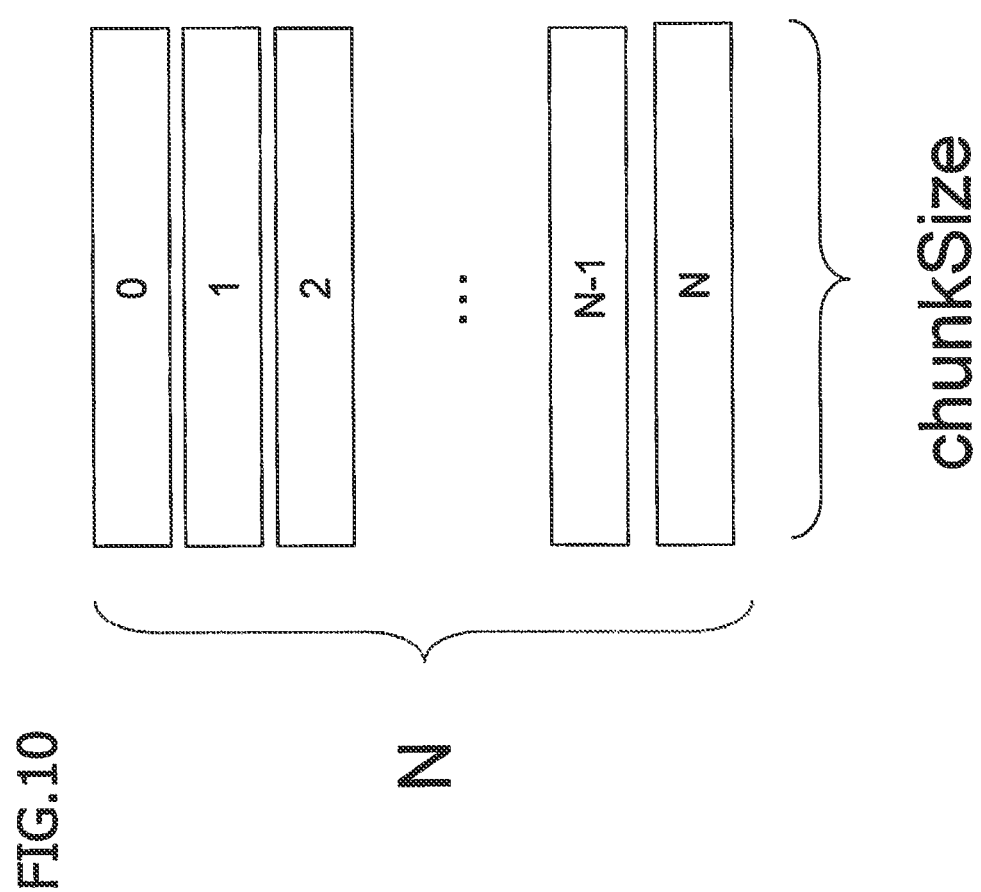
FIG. 10 is a diagram of the file transfer method according to the second embodiment.

FIG. 10 is a diagram of the file transfer method according to the second embodiment. In the first embodiment which was described in FIG. 2, the chunk size was fixed. Therefore, as illustrated by FIG. 3, the data length of the chunk 4-N-1 of the end may become less than the chunk size.

Therefore, in a case to use the maximum number of the simultaneous connection M, when parallel transferring the chunk 4-N-1 of the end with the chunk data of the previous order, the transferring of the chunk 4-N-1 of the end is completed earlier than the chunk data of other previous order. The embodiment prevents occurrence of the situation, and the transfer time is more shorten by dividing a file and parallel transferring with maximum number of simultaneous connection M.

As illustrated in FIG. 10, the chunk size of each chunk of the file is the same. This processing was described in the steps S2, S3 in FIG. 8. Because the chunk size of each chunk of the file is made the same, in a case to use the maximum number of the simultaneous connection M, when parallel transferring the chunk 4-N-1 of the end with the chunk data of the previous order, it is possible to prevent that the transferring of the chunk 4-N-1 of the end is completed earlier than the chunk data of other previous order. Therefore, it is possible to shorten transfer time more by dividing a file and parallel transferring with the maximum number of the simultaneous connection M.

Third Embodiment

In the first embodiment which was described in FIG. 2, the maximum number of the simultaneous connection (the number of the streams) M was constant. With the third embodiment which will be described in FIG. 11, FIG. 12, maximum number of simultaneous connection (the number of the streams) M is changed depending on transfer speed. For example, the maximum number of the connection is dynamically changed depending on the transfer speed of the chunk which already finished transfer.

Figure 11:
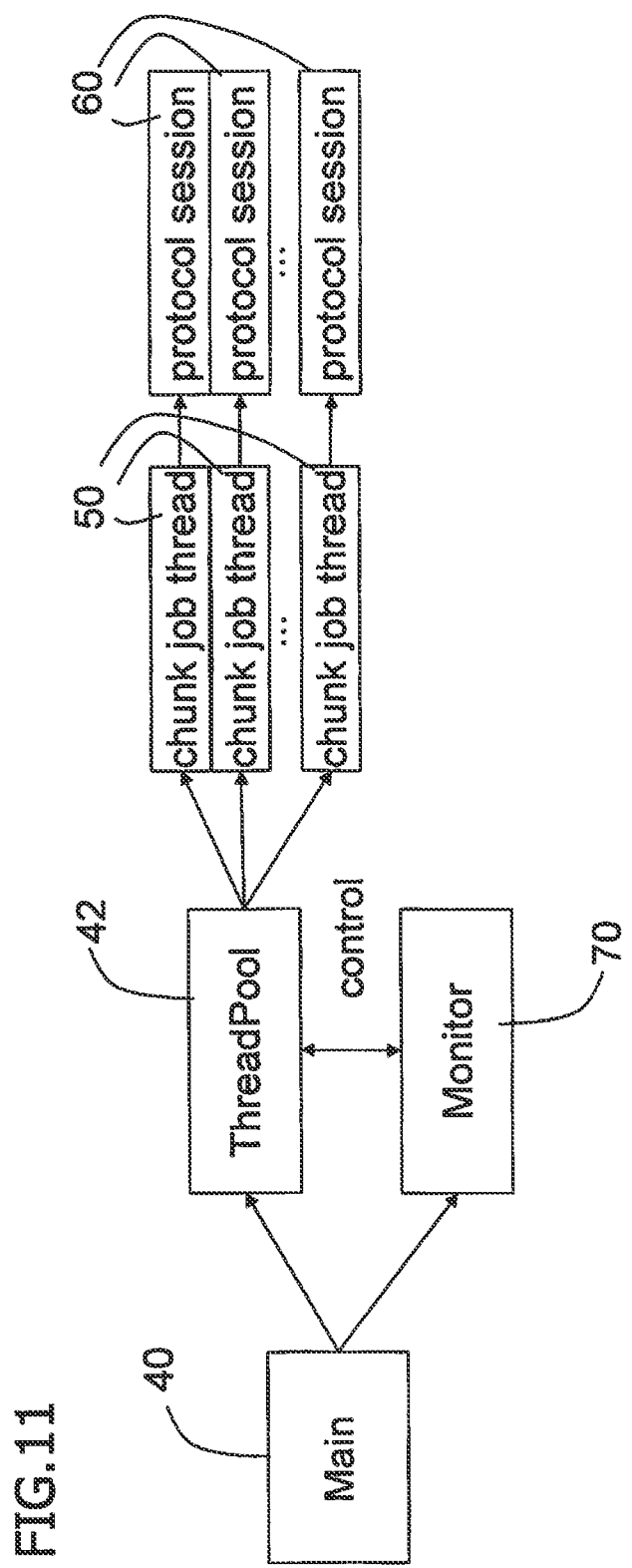
FIG. 11 is a diagram of software module constitution according to the third embodiment.

FIG. 11 is a diagram of software module constitution according to the third embodiment. In FIG. 11, the same elements which are illustrated by FIG. 2 to FIG. 6 are indicated by same sign. In other words, the constitution depicted by FIG. 11 is established a monitor module 70 other than the transfer job creation module 40, the thread pool 42, the transfer thread execution module 50 and the TCP wrapper 60. The monitor module 70 monitors a transfer speed with the TCP wrapper 60, and changes the maximum number of the connection M (the number of the transfer threads) in the thread pool 42.

Figure 12:
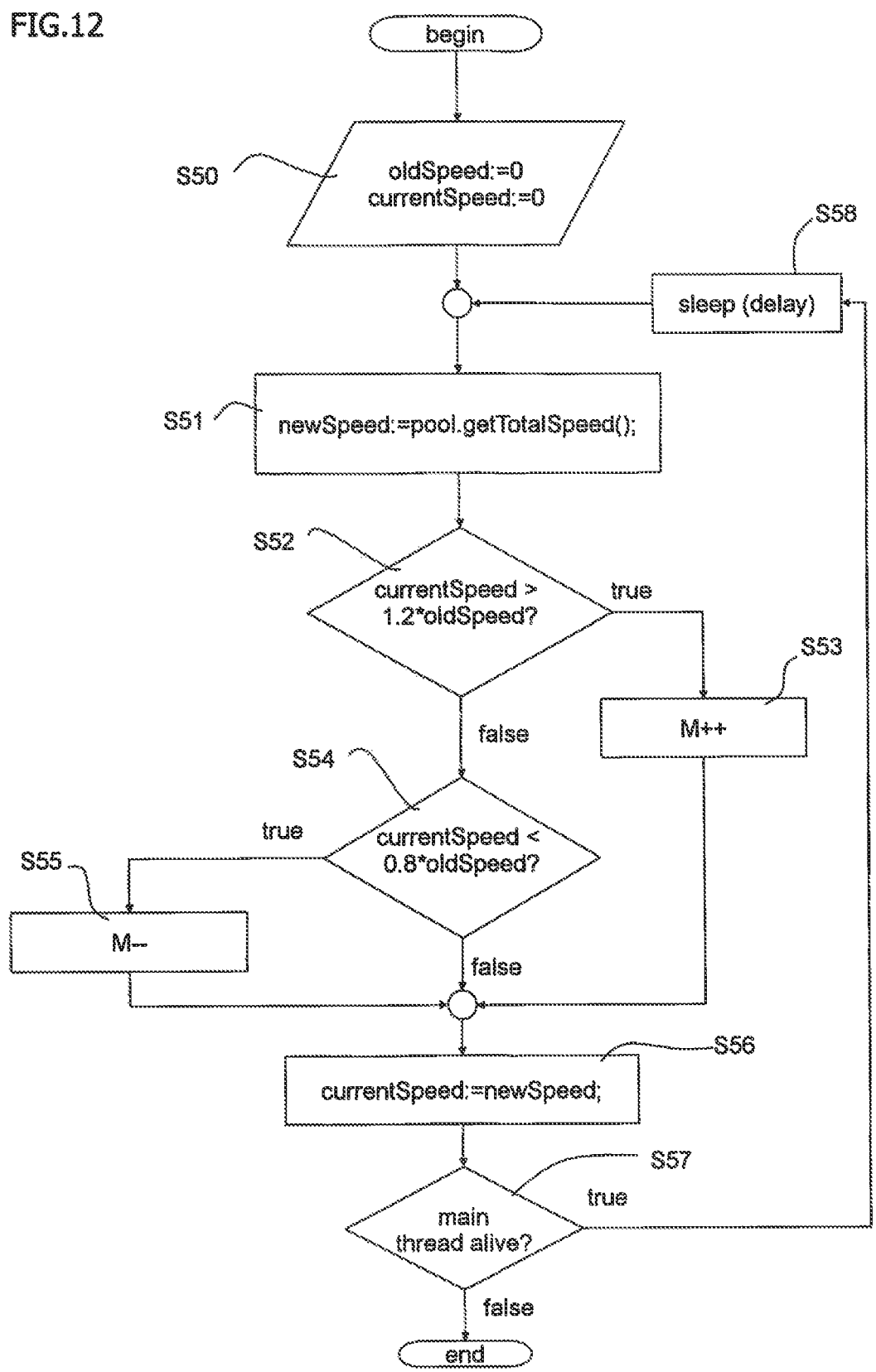
FIG. 12 is a flow diagram of the monitor module 70 in FIG. 11.

FIG. 12 is a flow diagram of the monitor module 70 in FIG. 11.

S50: The monitor module 70 initializes an old speed and a current speed to "0".

S51: The monitor module 70 acquires the transfer peed of all threads in the thread pool from the TCP wrapper 60 and calculates the total to get new speed "newSpeed".

S52: The monitor module 70 determines whether the current speed "currentSpeed" is faster than 12 times of the old speed "oldSpeed" before the delay time (for example, 1000 ms) which is set.

S53: When the current speed "currentSpeed" is faster than 12 times of old speed "oldSpeed" before 1000 ms (true), the maximum number of the connection M is incremented by "1". When represented by FIG. 8, the maximum number of the connection M in the step S4 increases.

S54: When the current speed "currentSpeed" is smaller than 12 times of old speed "oldSpeed" before 1000 ms (false), it is determined whether the current speed "currentSpeed" is smaller (or shorter) than 0.8 times of old speed "oldSpeed" before 1000 ms.

S55: When current speed "currentSpeed" is smaller than 0.8 times of old speed "oldSpeed" before 1000 ms (true), the maximum number of the connection M is decremented by "1", When represented by FIG. 8, the maximum number of the connection M in the step S4 decreases.

S56: The current speed "currentSpeed" is updated to the new speed "newSpeed" in the step S51.

S57: It is determined whether a transfer thread is completed to transfer in the thread pool 42. When the transfer thread is not completed to transfer in the thread pool 42 (false), the process finishes (false).

S58: On the other hand, when the transfer thread is completed to transfer in the thread pool 42 (true), it sleeps at 1000 ms and the process returns to the step S51.

In this way, the maximum number of the streams of the TCP is available effectively, since the maximum number of the simultaneous connection is changed depending on the transfer speed of the transfer thread during the transfer execution in the thread pool. In addition, it is possible to prevent useless retransmissions, since the maximum number of the simultaneous connection decreases when the transfer speed is slow.

Other Embodiment

According to the above-mentioned embodiments, the transfer of one file is described for an example, but it is applicable to transfer the plurality of files which are appointed to simultaneous transfer at the time of the start of the program. Or it is applicable when the directory is transferred at the same time. On this case, the division and multiplex communication of the file, which is described above, is carried out for every single file. In addition, the number of the simultaneous connection maintains at the start unit of program, and the number of the streams is calculated over a plurality of files.

Although one or more embodiments of the present invention have been described in detail, it should be understood that the various changes, substitution, and alterations could be made hereto without departing from the spirit and scope of the invention.

Availability in the Industry

A single file is divided into the data group of the N unit, and the transfer jobs of the N unit are created, and the transfer jobs of the N unit are multiple transferred in the connection (execution of the transfer thread) of the M unit using a maximum number of the TCP connection. Therefore, it is possible to transfer the file by using a band of reliable TCP to the full. In other words, it is possible to shorten the transfer time for file of the large size. In addition, because of the transfer of the offset indicating the position of the data group in the file with division data group, it is possible to restore an original file from the data group which are divided from the offset on the reception side, even if transferring data group of the file which are divided in an independent connection (or a channel).

What is claimed is:

1. A file transfer method comprising:
by a processor in a first device, dividing a single file in a memory into a plurality of data groups of N unit (N is an integer more than 2);
by said processor, creating a N number of transfer jobs, each of transfer jobs including the data group of the respective N unit and an offset position representing a start position of each of the data group of the N unit from a top data group in the single file, in a pool;
by said processor, assigning the transfer jobs of N unit to a plurality of transfer threads of M unit, M being an integer determined from a maximum number of simultaneous connection in TCP (Transmission Control Protocol);
by said processor, scheduling each of the transfer threads to a plurality of cores in the processor so that each core transfers a respective data group and offset position over the network; and
by said plurality of cores in the processor, transferring over a network to a second device the data group and the offset position of the transfer jobs of M unit which are assigned to the transfer thread of the M unit among the transfer jobs of N unit, in parallel, by the connections of the M unit of the TCP such that the second device is configured to:
(i) receive the data group and the offset position of the transfer jobs of M unit; and
(ii) restore said single file in a memory of the second device by writing each of data groups at a beginning of the offset position;
wherein each of the M connections formed by each of the M transfer threads transfers the data group and the offset position designated by the transfer job assigned to the transfer thread forming the connection.

2. The file transfer method according to claim 1, the transferring comprising:
transferring the data group and the offset position of the transfer jobs of M unit by executing the transfer thread of the M unit by TCP wrappers.

3. The file transfer method according to claim 2, the transferring comprising:
transferring the data group and the offset position of the transfer jobs of M unit by executing the transfer threads of the M unit by JVMs (Java Virtual Machine) in parallel.

4. The file transfer method according to claim 1, the assigning further comprising:
first assigning the transfer jobs of M unit among the transfer jobs of N unit to the transfer thread of M unit of the maximum number of simultaneous connection in the TCP in a thread pool; and
second assigning next transfer job among the transfer jobs of N unit to the transfer thread which completed to execute the transfer of the data group and the offset position of the transfer job.

5. The file transfer method according to claim 1, the transferring comprising:
encrypting each of the data group and the offset position of the transfer jobs of M unit; and
transferring the encrypted data group and the encrypted offset position by the connections of the M unit of the TCP.

6. The file transfer method according to claim 1, the assigning further comprising:
measuring communication speed of the connections of the M unit of the TCP on the network; and
changing the maximum number of simultaneous connection in the TCP based on the measured communication speed.

7. The file transfer method according to claim 1, wherein the N unit is determined by at least dividing a total size of the single file by a predetermined chunk size, and the plurality of data groups are ordered consecutively from a top data group of the N unit by assigning a pointer integer ranging consecutively from 0 to N-1 to each respective data group;
wherein the offset position for each respective data group is determined at least by multiplying the predetermined chunk size by the pointer integer assigned to the respective data group.

8. A non-transitory tangible computer-readable recording medium having stored therein a computer instruction cause a computer in a first device to execute a process for transferring a file over a network to a second device, the process comprising:
dividing a single file in a memory into a plurality of data groups of N unit (N is an integer more than 2);
creating a N number of transfer jobs, each of transfer jobs including the data group of the respective N unit and an offset position representing a start position of each of the data group of the N unit from a top data group in the single file;
assigning the transfer jobs of N unit to a plurality of transfer threads of M unit, M being an integer determined from a maximum number of simultaneous connection in TCP (Transmission Control Protocol); and
scheduling each of the transfer threads to a plurality of cores in a processor of the computer so that each core transfers a respective data groups and offset position over the network;
transferring over the network to the second device the data group and the offset position of the transfer jobs of M unit which are assigned to the transfer thread of the M unit among the transfer jobs of N unit, in parallel, by the connections of the M unit of the TCP such that the second device is configured to
(i) receive the data group and the offset position of the transfer jobs of M unit; and
(ii) restore said single file in a memory of the second device by writing each of data groups at a beginning of the offset position;

wherein each of the M connections formed by each of the M transfer threads transfers the data group and the offset position designated by the transfer job assigned to the transfer thread forming the connection.

9. The non-transitory, tangible computer-readable recording medium according to claim 8, the transferring comprising:
transferring the data group and the offset position of the transfer jobs of M unit by executing the transfer thread of the M unit by TCP wrappers.

10. The non-transitory, tangible computer-readable recording medium according to claim 9, the transferring comprising:
transferring the data group and the offset position of the transfer jobs of M unit by executing the transfer threads of the M unit by JVMs (Java Virtual Machine) in parallel.

11. The non-transitory, tangible computer-readable recording medium according to claim 8, the assigning further comprising:
first assigning the transfer jobs of M unit among the transfer jobs of N unit to the transfer thread of M unit of the maximum number of simultaneous connection in the TCP in a thread pool; and
second assigning next transfer job among the transfer jobs of N unit to the transfer thread which completed to execute the transfer of the data group and the offset position of the transfer job.

12. The non-transitory, tangible computer-readable recording medium according to claim 8, the transferring comprising:
encrypting each of the data group and the offset position of the transfer jobs of M unit; and
transferring the encrypted data group and the encrypted offset position by the connections of the M unit of the TCP.

13. The non-transitory, tangible computer-readable recording medium according to claim 8, the assigning further comprising:
measuring communication speed of the connections of the M unit of the TCP on the network; and
changing the maximum number of simultaneous connection in the TCP based on the measured communication speed.

14. The non-transitory, tangible computer-readable recording medium according to claim 8, wherein the N unit is determined by at least dividing a total size of the single file by a predetermined chunk size, and the plurality of data groups are ordered consecutively from a top data group of the N unit by assigning a pointer integer ranging consecutively from 0 to N−1 to each respective data group;
wherein the offset position for each respective data group is determined at least by multiplying the predetermined chunk size by the pointer integer assigned to the respective data group.

* * * * *